United States Patent [19]

Sato et al.

[11] 4,302,077

[45] Nov. 24, 1981

[54] BAYONET DEVICE FOR LENS BARREL

[75] Inventors: Akira Sato, Ohme; Takashi Isobe, Tokyo, both of Japan

[73] Assignee: Canon Kabushiki Kaisha, Tokyo, Japan

[21] Appl. No.: 78,770

[22] Filed: Sep. 25, 1979

[30] Foreign Application Priority Data

Sep. 29, 1978 [JP] Japan .................................. 53-120490
Nov. 2, 1978 [JP] Japan .................................. 53-135198

[51] Int. Cl.$^3$ .............................................. G02B 7/02
[52] U.S. Cl. .................................................. 350/257
[58] Field of Search ............... 354/286; 350/245, 251, 350/252, 257; 285/396

[56] References Cited

U.S. PATENT DOCUMENTS

2,780,137 2/1957 Bourgeois .......................... 350/257
3,758,198 9/1973 Kanie et al. ........................ 350/257

Primary Examiner—John Gonzales
Attorney, Agent, or Firm—Toren, McGeady & Stanger

[57] ABSTRACT

A lens barrel bayonet device is formed from two rings having corresponding claw portions arranged to engage mating claw portions on a camera body. In a preferred embodiment, the rings are joined together so that the claw portions of one of them also serve to seat spring members which engage the camera body when the lens barrel is mounted thereon. The spring members act to maintain the lens barrel steadily at a position where the optical axes of the lens and camera coincide with each other.

4 Claims, 13 Drawing Figures

BAYONET DEVICE FOR LENS BARREL

BACKGROUND OF THE INVENTION

1. Field of the Invention

This invention relates to a bayonet device for a photographic camera lens barrel, and particularly to a bayonet device having a simple shape and structure, thereby not only reducing the machining thereof, but also attaining substantial improvement in precision and strength.

2. Description of the Prior Art

A camera bayonet device for mounting and dismounting interchangeable lenses on and off the camera must have sufficient coupling precision and strength to enable tight mounting of the lenses, thus ensuring that signal members required for transmitting exposure control signals to the camera side and to the lens side, and interlocking members required for information transmission are maintained at their predetermined positions on the lens side. Further, regarding the structural arrangement on the lens side, a bayonet device on a lens barrel must be provided with claw parts and cut-away parts for engagement with corresponding bayonet parts on the camera side. Additionally, in order to restrict undesirable shifting movement of the lens system in the direction of the optical axes of the lens and the camera when the lens is mounted on the camera, dimensions must be restricted within close tolerances. These requirements result in complex structure and shape for the prior bayonet devices which, in turn, result in an increased number of machining processes. Conventional bayonet devices are made of stainless steel or the like for satisfactory mechanical performance and sufficient strength. Thus, such material is relatively expensive and inferior in workability. Since this material must be machined into a complex shape and structure, it has hardly been possible to lower the material and machining costs. Further, in the conventional bayonet devices, the bayonet member, which is provided on the side of a lens barrel for coupling with the bayonet member on the side of the camera body, not only has a complex shape and structure, but also requires a high degree of machining precision for its coupling face and for its dimensions in the direction of the optical axes of the lens and the camera when the lens is mounted on the camera. Such requirement for precision has also caused an increase in the number of machining processes and hindered cost reduction.

Further, conventional bayonet devices are generally arranged to effect restricted movement in the direction of the optical axes of the lens and the camera by way of resilient forces from a spring provided on the side of the camera and arranged to impose a positional restriction in the direction of its thrust. This spring is arranged in its thrust direction to absorb a tilt of the lens relative to a given angle between its optical axis and a film surface to be exposed, or between its optical axis and a view finder optical system of the camera, and also to absorb shifting or rattling play of the lens when mounted on the camera body. To minimize the tilting and rattling play of the lens, the force of the spring in the thrust direction must be as great as possible. However, a strong force of the spring impedes the lens mounting operation.

Free play is also known to exist in the radial direction of the lens and the camera within a tolerance range of coupling precision. It is desirable to have a certain degree of such play for easing the lens mounting operation. However, such a play, together with the weight of the lens barrel, causes the optical axis of the lens to deviate from the centr of the lens mounting position, and this, in turn, causes the exposure control signal members of the lens and the camera to deviate from their engaging positions. This deviation then makes correct transmission and receipt of signals between the lens and the camera body very difficult.

SUMMARY OF THE INVENTION

It is an object of this invention to provide a bayonet device for a lens barrel having a bayonet member which includes a plurality of members arranged to permit a change in the method of machining required on the members to enable the lens to be tightened into a camera body, and also to permit a change in material so that the number of machining processes can be reduced and simplified while still providing a bayonet device having at least the same precision and strength as those obtained by conventional machining processes.

It is another object of the invention to provide a bayonet device for a lens barrel which ensures correct signal transmission and receipt between a lens and a camera body with a spring member of the bayonet device arranged to have resilience in its thrust direction and also in the radial direction, the spring member being arranged to eliminate deviation of the optical axis of the lens from that of the camera and to ease the lens mounting operation.

It is still another object of the invention to provide a bayonet device for a lens barrel in which the spring member can be a part of a bayonet member which is formed from a plurality of members.

For a better understanding of the present invention, reference is made to the following description and accompanying drawing, while the scope of the present invention will be pointed out in the appended claims.

DESCRIPTION OF THE PREFERRED EMBODIMENT

Figure 1A:
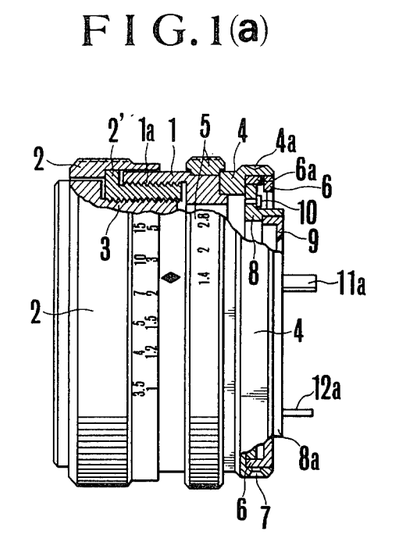
FIG. 1(a) is a partly sectional elevational view showing essential mounting parts of a lens barrel to which the bayonet device of the present invention may be applied.
Figure 1B:
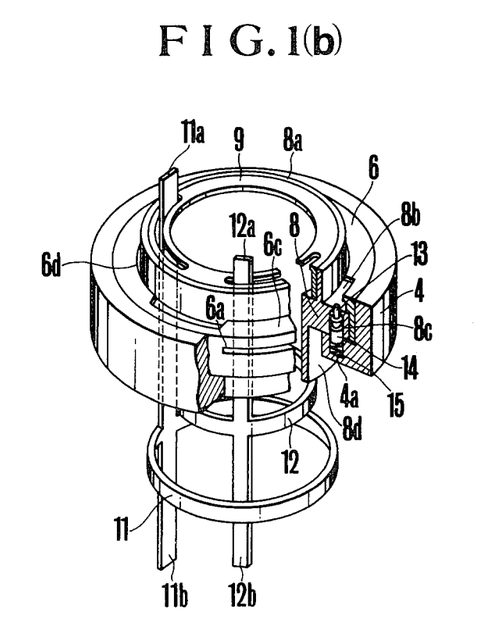
FIG. 1(b) is a partly sectional perspective view showing a portion of the lens barrel of FIG. 1(a)

Referring to FIGS. 1(a) and 1(b), which show a lens barrel to which the bayonet device of the present invention can be applied, a lens barrel body 1 is formed into a ring-like shape and is provided with a distance adjusting threaded engagement face 1a. A distance adjustment ring 2 is formed into one unified body together with an intermediate helicoid ring 2' which engages the threaded engagement face of the lens barrel body 1. The distance adjustment ring 2 is arranged to move the front lens group back and forth by means of a known helicoid spring. A bayonet mount holding ring 4 is uniformly secured to the rear of the lens barrel body 1. On the outer circumference of the ring 4, there is provided an engraved portion 4a for indicating a reference position to aid in mounting the lens barrel on a camera body. A stop ring 5 of a known type is rotatably fitted in a recessed ring portion between the lens barrel body 1 and the holding ring 4. Stop ring 5 is interlocked with a diaphragm device provided within the lens barrel body 1.

A bayonet member 6 is fitted into a stepped portion of the rear opening of the holding ring 4, and is arranged to resiliently engage a bayonet claw disposed on the side of the camera body when the lens is mounted on the camera body. The bayonet member 6 is secured by screws 7 to the end of the holding ring 4 at which the lens is to be mounted on the camera body. An adaptor member 8 is fitted in a recessed ring between the holding ring 4 and the bayonet member 6. The adaptor member 8 is arranged to be freely rotatable within the recessed ring, but not to be movable out of the ring, the member 8 being arranged to be rotatable relative to the fixed lens barrel 1. The leading end 8a of the adaptor is arranged to extend from the bayonet member 6 toward the camera body and, when the lens barrel is mounted on the camera body (not shown), the cylindrical shape of the leading end 8a of the adaptor 8 serves as a guide. A positioning pin 10 is provided on the mounting reference face of the adaptor 8 for determining the mounting position. The pin 10 is arranged to engage a slit (not shown), such slit being provided for determining the position of the lens barrel and then locking the adaptor member 8 in a predetermined position on the camera body.

A locking mechanism is formed by pins 13 and 14, a spring 15, and holes 8c and 4a, this mechanism being arranged to define the relative position of the adaptor member 8, holding ring 4 and the fixed lens barrel 1. In detail, a piercing hole 8c and an unpierced hole 4a are provided in the adaptor member 8 and the holding ring 4, respectively. Pins 13 and 14 are urged by spring 15 into the holes 8c and 4a, respectively. The tip of pin 13 is arranged to protrude above the mounting reference face of the adaptor member 8 so that, when the lens is dismounted from a camera body, the adaptor member 8 rotates back to its predetermined position relative to the holding ring 4, and the piercing hole 8c and the unpierced hole 4a coincide with each other, pins 13 and 14 being urged by the spring 15 so that pin 14 locks the adaptor 8 and holding ring 4. An aperture signal transmitting member 11 is rotatably carried by the fixed lens barrel 1, and is arranged to be rotatable on the optical axis of the lens within a predetermined range of angular rotation. The leading end 11a of the aperture signal transmitting member 11 is arranged so that, when the lens is mounted on the camera body, the end 11a can be interlocked with an interlocking member (not shown) provided on the other side of the camera body. The other end 11b of the signal transmitting member 11 is interlocked with an aperture presetting device (not shown), or with a diaphragm device.

A lens driving member 12 is arranged to receive a rotative driving force through its leading end 12a wherein the other end 12b of driving member 12 actuates either a presetting device or a diaphragm device (not shown). Lens driving member 12 is mounted for rotation in the holding ring 4. Both ends 11a and 12a of the aperture signal member 11 and lens driving member 12 extend toward the camera body through arcuate slits provided in a cover part 9 which is located at the leading end of the adaptor member 8.

An example of an embodiment illustrating the arrangement of the bayonet device of the present invention will now be described. Bayonet member 6 is prepared by welding or bonding together a first clamp (or bayonet) ring 6A (FIGS. 2(a) and 2(b)), and a second clamp (or bayonet) ring 6B (FIGS. 3(a)–3(c)), each of which are made of a material of uniform thickness and are formed into a flange-like shape. The joined clamps forming the bayonet member 6 are secured to the inside of holding ring 4 by the screw 7, or by a caulking member with a flange on the holding ring 4 being arranged to prevent the bayonet member 6 from coming loose.

Figure 2A:
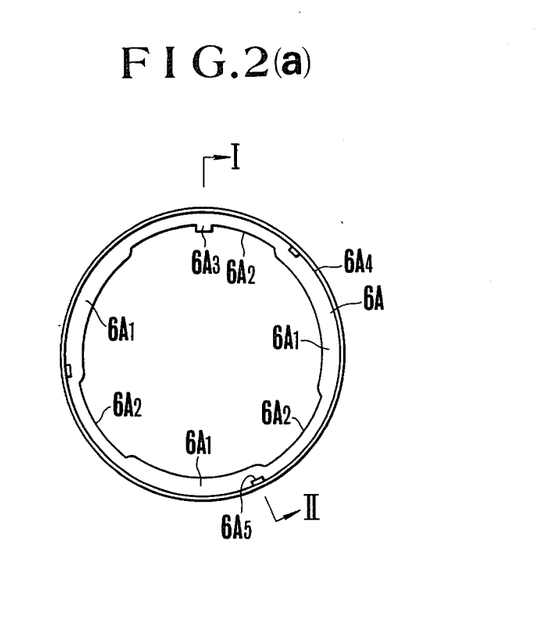
FIG. 2(a) is a plan view showing a first bayonet ring of the bayonet device of the present invention.
Figure 3A:
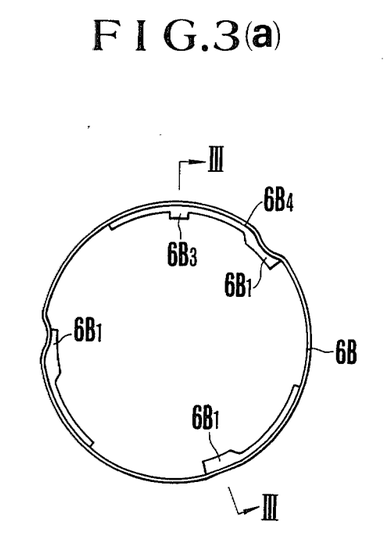
FIG. 3(a) is a plan view showing a second bayonet ring which is used to form a part of the bayonet device of the present invention.

Both of the clamp rings 6A and 6B are provided with bayonet claws 6A1 and 6B1 which are spaced at intervals of about 120°, as shown in FIGS. 2(a) and 3(a). Each of the clamp rings 6A and 6B is provided with a protruding member 6A3 and 6B3 which is integrally formed with the clamp ring and is located to confront the positioning pin 10 when the adaptor 8, fixed lens barrel 1 and holding ring 4 are positioned to be locked together, as shown in FIG. 1(a). The protruding members 6A3 and 6B3 are arranged to allow the lens to be detached from the camera body when the fixed part of the lens barrel and the adaptor member are rotated to a particular position relative to each other.

Figure 4A:
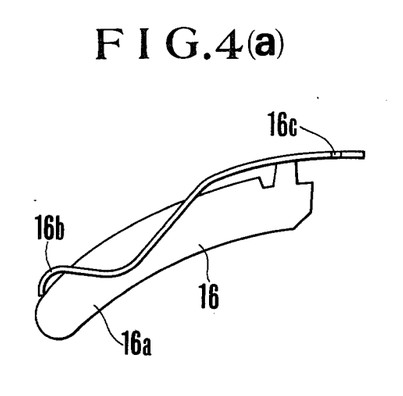
FIG. 4(a) is a plan view showing a spring member.
Figure 4B:
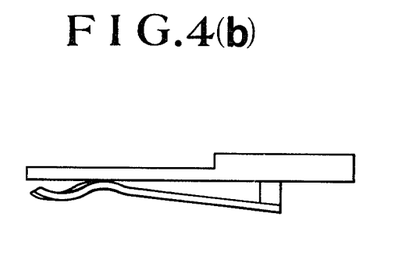
FIG. 4(b) is a front view of the spring member of FIG. 4(a)
Figure 5A:
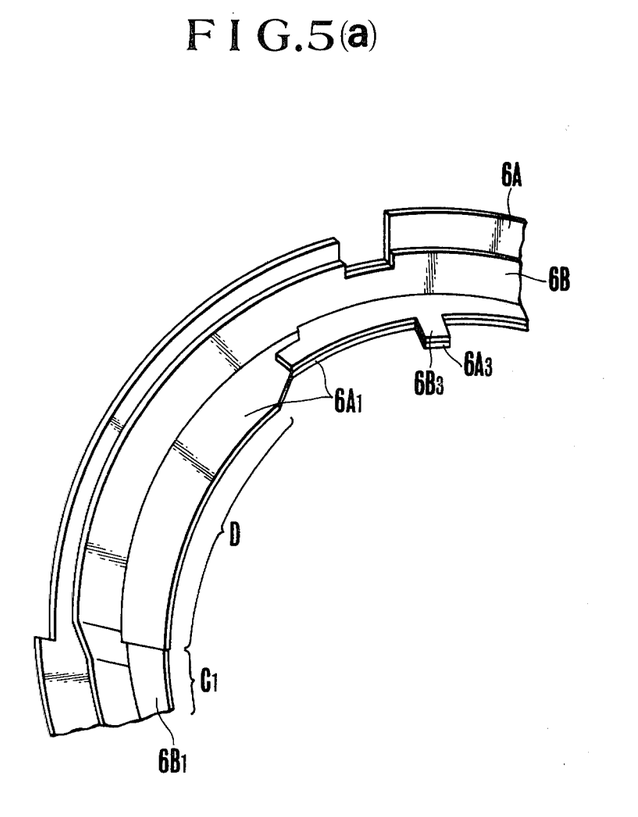
FIG. 5(a) is a perspecive view showing the essential parts of a bayonet member including the first and second bayonet rings according to the present invention.

In further detail, bayonet member 6 includes the clamp or bayonet rings 6A and 6B, shown in FIGS. 2(a) and 3(a), and a spring member which is shown in FIGS. 4(a) and 4(b). Clamp ring 6A has a flange portion 6A4 which is secured to the holding ring 4 of the lens barrel, a number of claw portions 6A1, and a number of cutaway portions 6A2. Clamp ring 6B is dimensioned to fit within clamp ring 6A, and is provided with a flange portion 6B4, and the same number of claw portions 6B1 and cut-away portions 6B2 as the corresponding portions of clamp ring 6A. The length of each claw portion 6B1 in the circumferential direction is shorter than each claw portion 6A1 of clamp ring 6A in the same direction. FIG. 5(a) shows rings 6A and 6B fitted together to form bayonet claws with overlapped claw portions 6A1 and 6B1 of the rings 6A and 6B. A part of each claw portion 6A1 of ring 6A which does not have the corresponding claw portion 6B1 overlapping it forms a seat for accommodating the spring member of FIG. 4(a) (see FIG. 5(a)). Referring to FIGS. 4(a) and 4(b), spring member 16 includes a spring portion 16a which is resilient in the thrust direction relative to the optical axis of the lens barrel, and another spring portion 16b which is resilient in the radial direction relative to the optical axis.

Figure 3B:
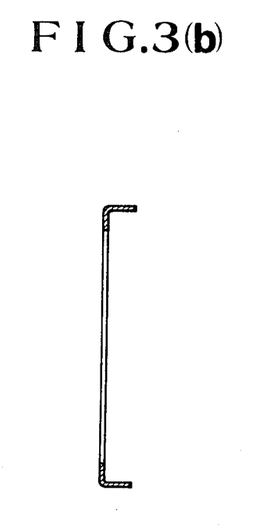
FIG. 3(b) is a sectional view taken along line III—IV of FIG. 3(a)
Figure 3C:
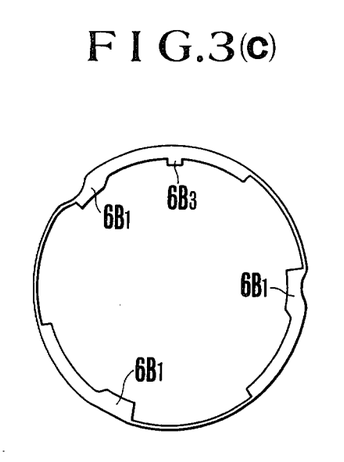
FIG. 3(c) shows the reverse side of the bayonet ring of FIG. 3(a)
Figures 5B, 6:
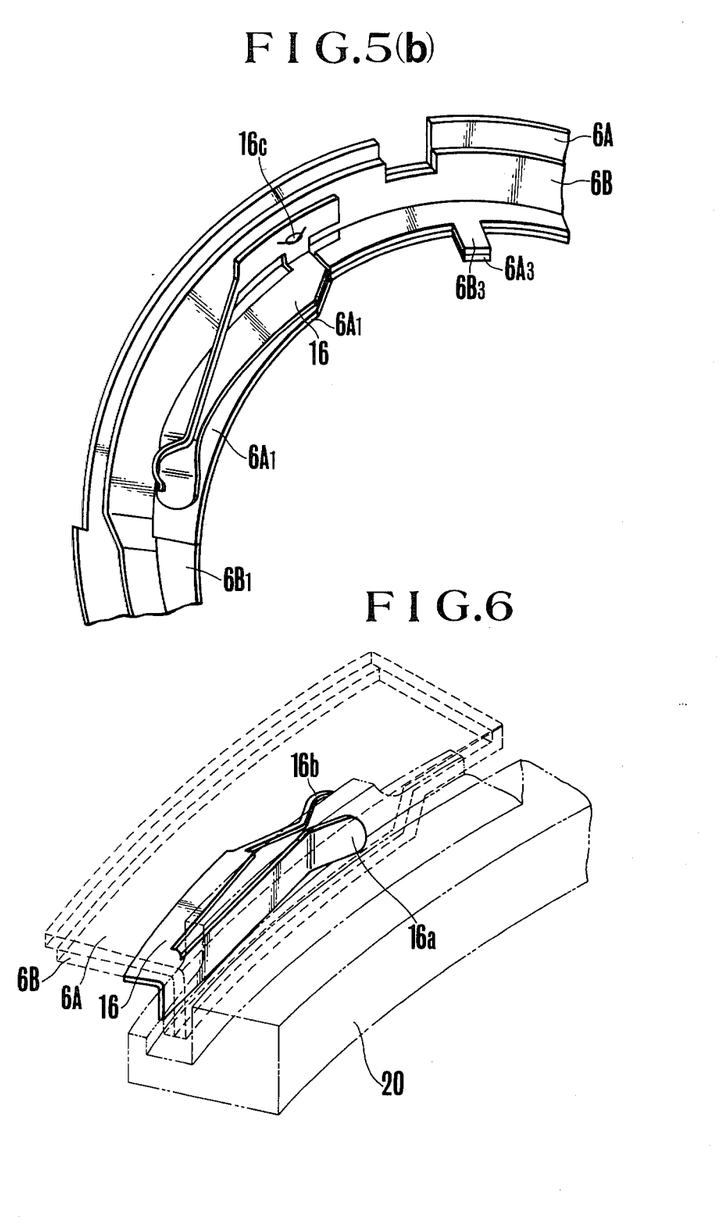
FIG. 5(b) is a perspective view showing a portion of the bayonet member of FIG. 5(a) with the spring member of FIG. 4(a) in place.
FIG. 6 is an illustration of a portion of a lens barrel provided with the bayonet device of the present invention, the barrel being mounted on a camera body.
Figure 7:
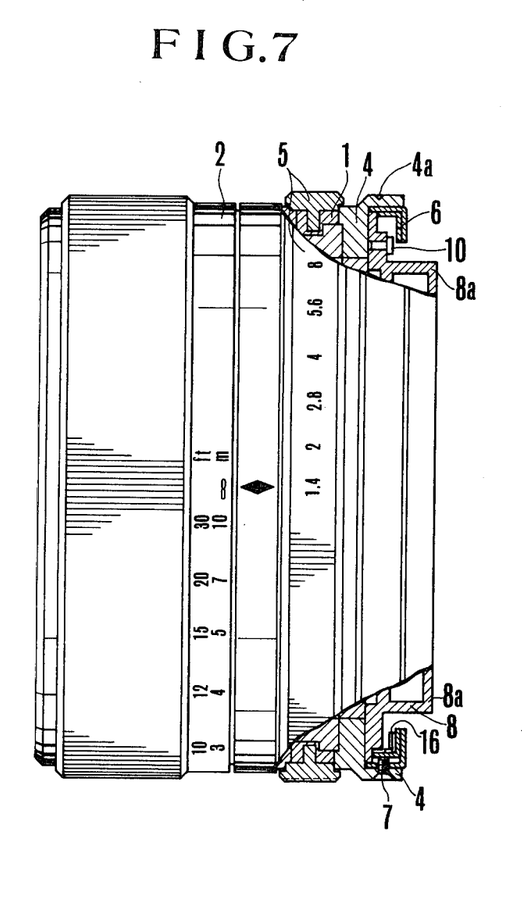
FIG. 7 is a side elevation view, partly in section, showing the bayonet device of the present invention mounted on the lens barrel of FIG. 1(a).

FIG. 5(b) shows important details of the assembled clamp rings 6A and 6B, and the spring member 16. When the claw portions and cut-away portions of the clamp rings are assembled together to coincide with each other and joined by welding or the like, there are provided a single layer portion and a double layer portion in each of the overlapped claw portions because claw portions 6A1 of clamp ring 6A are arranged to be longer than the claw portions 6B1 of clamp ring 6B. Spring member 16 is then seated on one of the single layer portions (i.e., a location where there is only a claw portion 6A1), spring member 16 then being secrued thereto by a screw or the like. In order to secure the assembled clamp rings 6A and 6B to holding ring 4, several burred openings 6A5 are provided on flange portion 6A4 to allow screws 7 to fix the assembled rings 6A and 6B to the inner wall of holding ring 4. As shown in FIGS. 3(a) and 3(c), flange portion 6B4 of clamp ring 6B is provided with three indents to accommodate the burrs of openings 6A5.

Figure 2B:
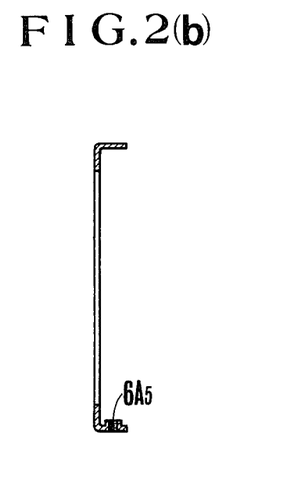
FIG. 2(b) is a sectional view taken along line I—II of FIG. 2(a)

In accordance with the present invention, clamp rings 6A and 6B, and spring member 16 are assembled as shown in FIGS. 5(a) and 5(b), and are secured to the holding ring 4 to obtain a bayonet device. To mount a lens barrel on a camera body with this bayonet device, the bayonet claw of the lens barrel, shown by broken lines in FIG. 6, is aligned with a cut-away portion (not shown) of a bayonet 20 on the camera body, and the lens barrel is rotated. To tighten the lens barrel onto the camera body in the thrust direction, spring portion 16a exerts a resilient force in this direction in cooperation with the claw of the lens barrel and the claw of the bayonet portion of the camera body (shown by two-dot chain lines in FIG. 6) in such a way as to clamp the lens barrel to the coupling face of the camera body. The optical axis of the lens barrel and the center of the lens barrel mounting portion are prevented from becoming misaligned relative to each other by the resilient force of the spring portion 16b of spring member 16, this force being exerted in the radial direction to cause the lens barrel and the camera to coincide on their optical axes. Clamp rings 6A and 6B which form the bayonet member 6 of the present bayonet device can be formed of uniform thickness as shown in FIGS. 2(b) and 3(b), and can be easily manufactured by a press working process. Even though the lens barrel has the adaptor member 8 arranged to be rotatable as shown in FIG. 1, adaptor member 8 can be prevented from coming apart from the lens barrel and yet remain rotatable by having the flange face dimension of clamp rings 6A and 6B differ from each other. The provision of longer claw portions for the clamp ring 6A than those of the clamp ring 6B, to provide a seat for placement of the spring member 16, also permits the easy manufacture of the bayonet device as a single component part, at a low cost through use of conventional machining processes. With the bayonet device arranged in this manner, no problems arise in terms of shape, dimensions, and the like, when the bayonet device is fitted into the leading end of the holding ring 4.

Further, in accordance with the present invention, the spring member can be made in the form of a single part by forming the spring portion 16a, which is resilient in the thrust direction, and the spring portion 16b, which is resilient in the radial direction, by a press working process or the like. It is also possible to make the spring portions 16a and 16b individually as separate parts.

The bayonet device of the present invention is capable of preventing misalignment or deviation of the optical axis of the lens barrel from that of the camera body means of a spring force exerted by the device in the radial direction. The signal members of the lens barrel and the camera body can be brought into engagement in their correct mounting positions to ensure correct transmission and receipt of signals for exposure control of the camera.

While the foregoing description and drawing represent the preferred embodiments of the present invention, it will be obvious to those skilled in the art that various changes and modifications may be made therein without departing from the true spirit and scope of the present invention.

What is claimed is:

1. A lens barrel bayonet device for enabling a lens barrel to be bayonet mounted to a camera body, said device comprising:
   (a) a first bayonet ring having a flange portion for securing said device to a camera lens barrel, and first bayonet claw portions and first cut-away portions cooperatively arranged on said first ring to be in bayonet coupling relationship with an external camera body bayonet device;
   (b) a second bayonet ring having second bayonet claw portions and second cut-away portions arranged to coincide with the bayonet claw and cut-away portions of said first ring, said second ring being securely seated within the flange portion of said first ring so that a spring seat is defined by adjacent ones of said first and second claw portions; and
   (c) a spring member located in said spring seat for engaging the camera body bayonet device to urge the lens barrel in axial and radial directions relative to the optical axis thereof when the lens barrel is mounted to the camera body.

2. A lens barrel bayonet device according to claim 1, wherein said spring member is constructed and arranged to be resilient in two directions relative to said optical axis.

3. A bayonet device for enabling a lens barrel having an optical axis to be bayonet mounted to a mating bayonet part on a camera body, the bayonet part including a number of bayonet claw portions and cut-away portions, said device comprising:
   (a) a bayonet member including a number of bayonet claw portions for connection with the bayonet claw portions of the camera bayonet part, and cut-away portions arranged on said bayonet member to be in coupling relationship with the camera bayonet part; and
   (b) a spring member mounted on said bayonet member for applying first and second coupling forces to one of the bayonet claw portions of the camera bayonet part, said spring member including a first part arranged to provide said first coupling force to urge the lens barrel in the direction of the optical axis of the lens barrel and a second part arranged to provide said second coupling force to urge the lens barrel in a radial direction relative to the optical axis when the lens barrel is mounted to the camera bayonet part.

4. A bayonet device according to claim 3, wherein at least one of said bayonet claw portions of said bayonet member has a seat for receiving said first part of said spring member.

* * * * *